Patented July 22, 1941

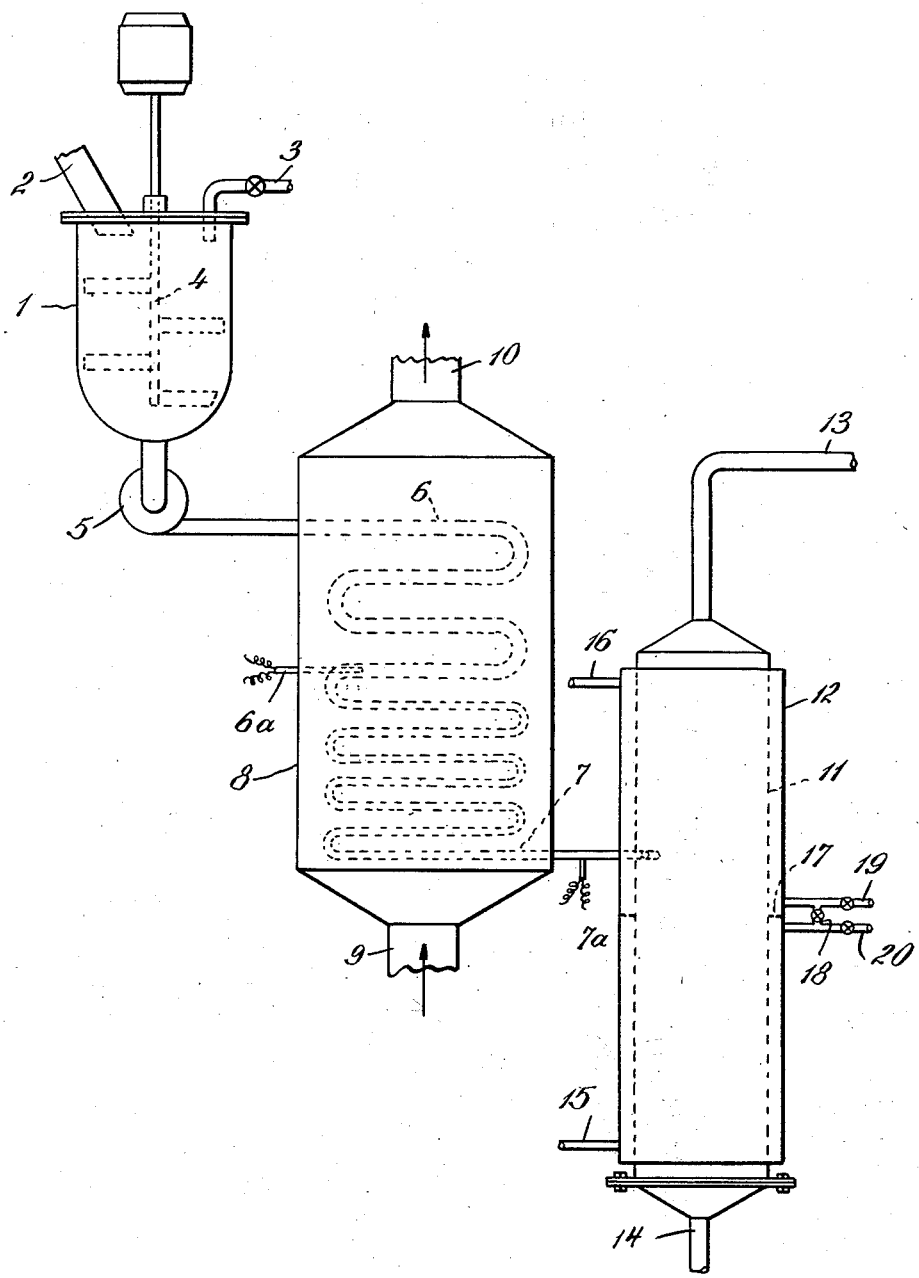

2,250,091

UNITED STATES PATENT OFFICE 2,250,091

DEHYDRATION OF MALEIC ACID

George B. Campbell, Manhasset, and Frank Porter, Syracuse, N. Y., assignors to The Solvay Process Company, New York, N. Y., a corporation of New York Application March 27, 1939, Serial No. 264,408

15 Claims. (Cl. 260—343)

This invention relates to the conversion of maleic acid to maleic acid anhydride, more frequently designated simply maleic anhydride, and is particularly concerned with a novel method for effecting the decomposition of maleic acid to produce a vapor mixture comprising maleic anhydride and water vapor with a maximum yield of the maleic anhydride and a minimum conversion of the maleic acid to fumaric acid and other by-products.

The present invention has for its object the simplification of apparatus required to accomplish the decomposition of maleic acid and the avoidance of tarry residues on heating surfaces in the heating and decomposition zones.

Further objects will appear from the following description of the invention.

In accordance with the process of the present invention, maleic acid to be decomposed is mixed with an inert flux, the mixture is heated rapidly to a temperature between 160° C. and 400° C. under pressure, and the pressure is then released to effect the separation of water from the mixture.

By "flux" as used in the present application is meant any material which is chemically inert with respect to maleic acid and anhydride, is heat-stable under the temperature conditions employed and is a fluid liquid within the range of temperatures employed. The flux may be a solvent or non-solvent for the maleic acid. It may be volatile or non-volatile.

Since to minimize formation of fumaric acid the maleic acid should be mixed with the liquid medium at low temperatures, below 130° C., and advantageously below 100° C., the liquid preferably should not solidify at such temperatures. It is preferred to employ a liquid which for the most part may be retained in liquid phase at the decomposition temperature employed since this avoids the necessity of supplying to the mixture latent heat of vaporization of the liquid as well as that of the maleic acid. If a liquid other than maleic anhydride is employed, one preferably is employed which has a distillation range or boiling point relatively remote from the boiling point of maleic anhydride in order that separation may be readily accomplished by fractional distillation. Suitable liquids for the purposes of the invention are hydrocarbons, such as alpha and beta-methyl-naphthalenes, diphenyl, refined petroleum fractions of high-boiling range, boiling, say at about 240° C. or above; ethers, such as diphenyl oxide; esters, such as methylphthalate and butyl succinate; organic acids, such as benzoic acid; acid anhydrides, such as tetrachlorphthalic acid anhydride, maleic acid anhydride, and succinic acid anhydride; and fused salt mixtures, for example mixtures of sodium maleate and sodium hydrogen sulfate. Those compounds having undesirably high melting points may be mixed with other materials, for example maleic anhydride to produce lower melting products.

The most suitable proportions of maleic acid and inert liquid will vary depending upon the design of the heating apparatus and the nature of the liquid selected. The essential feature is the provision of sufficient liquid so that the slurry is highly fluid and may be caused to flow at high velocity through a heating zone and into a decomposing zone.

The heating zone is preferably a tubular heater comprising a high velocity section for heating the mixture above 130° C., and a low velocity section for heating the mixture up to 120° or 130° C. The decomposing zone is preferably a vapor separating chamber adapted to maintain the liquid at or near its peak temperature while providing adequate surface for escape of vapors. The heating zone and decomposing zone may be heated by combustion gases or by a heating liquid or a vapor such a diphenyl vapor, mercury vapor, etc.

The tubes preferably should be constructed of a corrosion resistant material such as chromium-nickel-molybdenum iron or steel or a silver or copper alloy. Corrosion may be reduced by de-aeration of entering mixture and by using a liquid which wets the tube surface with a protective film, for instance a hydrocarbon oil possessing lubricating properties, and by using low ratios of maleic acid to total liquid.

The tubular heater is normally operated at relatively high pressure, for instance as high as 50 pounds gage or higher at the inlet, and the vapor separating chamber at relatively low pressure on the order of one atmosphere or less. Thus little or no vaporization takes place in the tubular heater and heat transfer is effected from the walls of the tube to the liquid therein without passage through vapor films. However, even if quantities of vapor are formed the high velocity of the liquid passing through the heater scours such vapors from the tube walls and prevents serious interference with heat transfer.

The hourly space velocity of the flux-maleic acid mixture through that portion of the heating zone above 130° C. should be at least 60.

For a more complete understanding of the invention reference may be had to the accompanying drawing illustrating diagrammatically an apparatus for carrying out the process.

Numeral 1 designates a mixing vessel having a maleic acid inlet 2, a liquid inlet 3 and a motor driven agitator 4. Pump 5 is arranged at the bottom of the mixing vessel to pump mixture therefrom through heating coil 6, which as shown, may be of relatively large cross-section so that the low temperature mixture will flow freely therethrough, and thence through coil 7 of more restricted cross-section, forming the high velocity section of the heater.

A chamber 8 surrounds the heating coils and is provided with inlet 9 and outlet 10 for heating fluid.

Coil 7 leads to a cylindrical flash chamber 11 and, as illustrated, discharges circumferentially and, if desired, at a slight downward incline within chamber 11. Chamber 11 is provided with a heating jacket 12, a vapor outlet 13, and an outlet for liquid or solid 14. The chamber 11 may be operated as a flash and decomposition chamber only; or as a flash chamber and heating and decomposition chamber; or as a flash chamber and a heating and decomposition chamber and a still for refining liquid employed as the carrier medium. It may be designed with an easily removable bottom for easy access for removing residual deposits therefrom. Depending upon the intensity of heat applied to the chamber, residue may be removed as a liquid or as a semi-solid or solid. In the latter case the chamber may be provided with a scraper in the lower portion for removing residue from the chamber walls. Preferably, however, the operation is conducted so that the residue is fluid and may be removed as liquid from the chamber. The heating jacket 12 has inlet 15 and outlet 16 for heating fluid. It may be divided into two separate compartments by a partition 17. The two compartments may be joined by a valved connecting pipe 18 which may have additional inlet 19 and outlet 20 to permit using a different heating medium in the lower portion if a substantially higher temperature is desired in this section than is desired in the upper section.

The above apparatus may be operated as follows for the production of maleic anhydride, using maleic anhydride as the inert liquid medium for conveying the solid maleic acid:

Maleic anhydride is introduced into mixing vessel 1 through inlet 3 and is pumped through coils 6 and 7 into vapor separating chamber 11. A heating fluid, such as hot combustion gas at a temperature around 400° C. or condensing mercury or diphenyl vapor, is passed up around coils 6 and 7 to supply heat thereto. A heating fluid, for instance high pressure steam at a temperature around 200° C. is introduced into the jacket 12 to maintain vapor separating chamber 11 at a high temperature. Maleic anhydride vapors pass off from vapor separating chamber 11 through vapor conduit 13 which leads to a suitable fractional condenser for condensing out maleic anhydride at a temperature, say of 110° C., if the chamber 11 is maintained at atmospheric pressure, or at a lower temperature if the chamber 11 is maintained at a pressure below atmospheric. Unvaporized maleic anhydride may be withdrawn at 14.

When the maleic anhydride at the point at which coil 6 unites with coil 7 is about 130° C. and maleic anhydride leaving coil 7 is about 180° to 190° C., which may be determined by means of thermocouples 6a and 7a, solid, finely divided, preferably pulverized, maleic acid is introduced into vessel 1 through inlet 2. The ratio of acid to anhydride is adjusted at about one mol of acid per mol of anhydride and the rate of flow through the coils is such that the slurry is within the heating system for not more than about 20 seconds and passes through the high velocity section 7 in between five and ten seconds. The mixture, at about 190° C., enters vapor separating chamber 11 at high velocity and forms a spiral of liquid flowing down the walls of this chamber. The high velocity of the liquid forces it against the wall of the chamber 11 as a vigorously agitated film less than a half cm. thick (in the neighborhood of 1 mm. thick), and vapors escape freely toward the center of the chamber and out through conduit 13. The high velocity of the liquid mixture also serves to prevent entrainment of liquid particles with the vapors passing out via conduit 13, the liquid particles being separated centrifugally from the vapors. Vapors consisting of maleic anhydride vapor, water vapor, and small amounts of fumaric acid vapor and gaseous products may be fractionally cooled, with or without rectification, to separate a major portion of the maleic anhydride at about 110° C. while permitting water vapor and the remaining anhydride to pass through in vapor phase. Residual vapors then may be further cooled and, if desired, scrubbed to completely remove the remaining anhydride (as maleic acid).

The rapid spiral flow of liquid down the walls of chamber 11 provides intimate contact between the walls and liquid and serves to increase the efficiency of heat transfer. The major portion of the maleic anhydride finally reaches the bottom of the vapor separating chamber and passes out at 14 for recirculation.

Prior to recirculating, a portion of the anhydride is refined by distillation to separate tarry constituents and the refined maleic anhydride may be returned to the heating system. By bleeding off and refining a small proportion of the anhydride, the percentage of tarry constituents therein may be maintained low enough to have no material effect upon the viscosity of the mixture passing through the coils.

The maleic anhydride returned at 3 preferably should be cool enough so that the mixture of anhydride and acid formed in vessel 1 is at a temperature of 100° C. or lower. While higher temperatures can be employed and the use of such temperatures permits a shortening of the first section 6 of the heating coil, or its practical elimination, some time is required for producing a uniform mixture and the maintenance of the maleic acid at a higher temperature effects an increased formation of fumaric acid. Moreover the high temperature mixture is more corrosive with respect to the pump surfaces than the lower temperature mixture.

Instead of purifying the liquid conveying medium in a separate still, purification may be accomplished directly in chamber 11; thus, the walls of chamber 11 may be maintained at around 250° C. so as to vaporize not only a part of the maleic anhydride but all of it, present both as carrying medium and as a product of maleic acid decomposition. With such a method of operation the liquid thickens as it flows down the walls of chamber 11 and the tarry residue consisting for the most part of maleic anhydride, fumaric acid, and tarry or pitchy constituents may be withdrawn as liquid at 14. This liquid may be leached with hot water to separate the fumaric acid and maleic anhydride and the residue may be burned; or the entire tar may be burned to effect its disposal. Alternatively, it is possible to heat the tar until removal of maleic anhydride therefrom is substantially complete and the product is solid. The solid product may be disposed of in any suitable manner.

In the procedure described above the sensible heat for bringing the maleic acid to decomposition temperature and a part of the heat required for decomposition and vaporization are supplied in coils 6 and 7. The balance of the heat required for decomposition and vaporization is supplied through the walls of chamber 11. The proportion of maleic acid decomposed by sensible heat of the mixture may be varied by varying the liquid temperature at the outlet of coil 7, by varying the proportion of maleic acid in the slurry, and by varying the pressure in the flash chamber 11. Using maleic anhydride as the liquid medium for conveying the slurry, it is preferable to effect at least part of the decomposition by heat supplied through the walls of chamber 11. However, the proportion of heat thus supplied may be reduced to a low value by increasing the ratio of maleic anhydride to maleic acid in the slurry up to 5:1 or higher and heating the slurry in coil 7 to a temperature of 250° to 300° C., or by reducing the pressure in chamber 11.

The use of a high-boiling inert liquid which has relatively little vapor pressure at temperatures below about 250° C., permits the practicable operation of the process using entirely sensible heat of the liquid mixture for supplying the heat required for the process. Thus, employing one part of maleic acid for each five parts of conveying liquid and a temperature between 270° and 280° C. at the outlet of coil 7, no heat need be supplied to the walls of chamber 11 to effect the decomposition. The maleic acid during decomposition absorbs the sensible heat as heat of decomposition of maleic acid and heat of vaporization of resulting maleic anhydride and water; hence vapors and liquid leaving the vapor separating chamber will be at a temperature on the order of 180° C. By further reducing the ratio of maleic acid to liquid medium, still lower maximum temperatures may be employed while at the same time complete decomposition of the acid to anhydride and water vapor is effected by means of the sensible heat of the mixture. It is advantageous to apply vacuum to chamber 11 so that the decomposition and subsequent maleic anhydride condensation may be effected at a pressure below about one-third atmosphere, on the order of one or two tenths of an atmosphere absolute. In this way still lower maximum temperatures will suffice.

The operation of the vapor separating chamber at pressures substantially below atmospheric has several advantages. First, it lowers the temperature at which the decomposition goes to substantial completion; by conducting the process at lower maximum temperature higher heat efficiencies are obtained, the corrosion of surfaces in contact with maleic acid is reduced, and the inversion of maleic acid to fumaric acid is decelerated. Second, it permits the operation of the maleic anhydride condenser in a range of temperatures at which most effective separation of maleic anhydride and water vapor may be obtained. Third, it permits an increase in the proportion of heat supplied to the mixture in coil 7 with the result that corrosion may be almost completely confined to this relatively inexpensive and easily replaceable unit of the system.

The use of a maximum temperature sufficiently low so that the maleic anhydride is retained for the most part in liquid phase is desirable in order to minimize the required heat input into the mixture in those cases where it is desired to effect substantially the entire heating in the coil 7. It also may be desirable to employ somewhat lower maleic acid concentrations than for the process involving a substantial proportion of the heat input in chamber 11. Thus proportions of maleic acid from one-fourth to one-third of the total mixture are advantageous. When temperatures conducive to retention of maleic anhydride in liquid phase are employed, a rectifier or fractional condenser may be placed on line 13 and maleic anhydride which goes off with water vapor from chamber 11 may be returned thereto and the entire maleic anhydride product may be removed through outlet 14, and separated from any tar and fumaric acid present by distillation, preferably in vacuo.

If maleic anhydride or a petroleum oil, such as a refined Pennsylvania steam distillate or bright stock, is employed as diluent a considerable proportion or all of the acid may be carried in solution at higher temperatures, thus improving the efficiency of heat transfer to the acid.

When a sufficiently high-boiling liquid is used so that relatively insignificant amounts are vaporized in chamber 11 and the process is conducted to vaporize most or all of the maleic anhydride, it becomes necessary to effect refinement of the liquid for removal of tarry materials either by vacuum or inert gas distillation or by adsorption or gravity or centrifugal separation in the presence of a selective solvent.

Also when such a liquid is employed as the conveying medium and is purified by distillation, it is desirable to operate the lower section of vapor-separating chamber 11 at around or above the boiling point of maleic anhydride at the prevailing pressure in order to minimize the content of maleic anhydride in the liquid withdrawn at 14, since, if the anhydride is carried off to the still employed for refining the liquid medium, special recovery apparatus such as scrubbers may be required to prevent exhaustion of maleic anhydride to the atmosphere.

In the above process a heating time of five to ten seconds in the zone above 130° C. has been indicated corresponding to an hourly space velocity of flux-maleic acid mixture through the heating coil 7 of 360 to 720. Lower velocities may be employed, however, especially when a major portion of the heat for maleic acid decomposition and vaporization is supplied in chamber 11 or when vacuum is applied to chamber 11 and the maximum temperature of the mixture is thus reduced. On the other hand, even higher space velocities are desirable if maximum temperatures approaching 400° C. are employed.

The coil 7 may be provided with a constriction or nozzle at its outlet end to maintain a high pressure in the coil throughout its extent. If no nozzle is provided the pressure drop through the coil 7 will be gradual and substantial vaporization can take place therein. As previously noted this is not objectionable as long as the linear velocity is high enough to carry evolved vapors along as a part of the fluid stream and vapor film formation is prevented. An average linear velocity through coil 7 of 5 feet, preferably 10 feet, per second or more may be used to advantage for a heating tube ¾ inch in inside diameter and from 25 to 100 feet in length. It is not desirable to use tubes larger than 2½ inches in inside diameter for coil 7 and even with such a tube exceedingly high linear velocities and an exceedingly long tube are necessary in order to introduce the desired amount of heat.

At the high velocities employed, any tarry products of the heating step are scoured from the heating surfaces while still fluid and before they have an opportunity to form permanent deposits. Thus the heating surfaces are kept clean and the tarry products are carried out of the heating system by the slurry or solution.

Instead of distributing the maleic acid inert liquid mixture as a film on a hot surface in chamber 11, it may be sprayed into a hot vapor. Thus a suitable spray nozzle may be supplied at the outlet end of coil 7 so that the mixture is sprayed into the vapor space in chamber 11. If the walls of chamber 11 are maintained at a temperature on the order of 250° C. and the liquid employed is maleic anhydride, the liquid dropping to the bottom of the chamber will be vaporized and the vapors heated to a temperature substantially above 200° C. These vapors coming into intimate contact with the spray of incoming liquid, instantly give up a portion of their heat to the liquid and effect the desired decomposition.

The vapors passing up through the chamber 11, may also supply substantial heat to the liquid film when the film type of heating method is employed. Thus it has been pointed out that the bottom of the vapor separating chamber may be heated sufficiently high to vaporize the maleic anhydride conveying medium as well as the maleic anhydride formed by decomposition. In such case the hot maleic anhydride vapor formed at a temperature around 202° C., if atmospheric pressure is employed, rises in contact with the film of liquid which may be at a temperature of 180° C. to 190° C. and thus the film is further heated. In this case it will be observed that the liquid film is heated on one side by contact with the hot walls of chamber 11 and on the other side by the hot vapors of maleic anhydride.

Instead of employing either the film method or the spray method of heating, a combination of the two may be used. Thus the outlet of pipe 7 may be employed to direct a spray of liquid out against the walls of chamber 11 so that the liquid is first heated in the form of a spray and then in the form of a film.

By a slight modification of chamber 11, the maleic anhydride vapor may be superheated to about 250° C. before it is brought into contact with the maleic acid anhydride mixture.

We claim:

1. The method of decomposing maleic acid to maleic anhydride which comprises mixing the maleic acid with sufficient heat-stable, fluid flux, chemically inert to maleic acid and maleic anhydride, to provide a fluid mixture, heating the mixture rapidly to a temperature above 160° C. but below the temperature at which substantial pyrolytic composition of maleic anhydride occurs under pressure and then reducing the pressure on the mixture to effect separation of water vapor therefrom.

2. The method of decomposing maleic acid to maleic anhydride, which comprises forming a mixture of the maleic acid with sufficient heat-stable, fluid flux, chemically inert to maleic acid and maleic anhydride, to provide a mixture fluid at 130° C., heating the mixture to 130° C. and passing the hot mixture through a heated zone at elevated pressure at an hourly space velocity of at least 60, supplying heat to the mixture while passing through said zone at such a rate as to elevate the temperature of the mixture to between 160° C. and 400° C. and then discharging the mixture into a zone of relatively low pressure with respect to the pressure of said first zone, thereby effecting separation of water vapor from said mixture.

3. The method of decomposing maleic acid to maleic anhydride, which comprises forming a mixture of the maleic acid with sufficient heat-stable, fluid flux, chemically inert to maleic acid and maleic anhydride, to provide a mixture fluid at 130° C., heating the mixture to about 130° C. and passing the hot mixture through a heated zone at elevated pressure at an hourly space velocity of at least 60, supplying heat to the mixture while passing through said zone at such a rate as to elevate the temperature of the mixture to between 160° C. and 350° C. and then discharging the mixture into a zone of relatively low pressure with respect to the pressure of said first zone, thereby effecting a separation of water vapor and maleic anhydride vapor from said mixture.

4. The method of decomposing maleic acid to maleic anhydride, which comprises forming a mixture of the maleic acid with sufficient heat-stable, fluid flux, chemically inert to maleic acid and maleic anhydride, to provide a mixture fluid at 130° C., heating the mixture to about 130° C. and passing the hot mixture through an externally heated tube having a length to diameter ratio of at least 400:1, at an hourly space velocity of at least 360, supplying heat to the mixture while passing through said tube at such a rate as to elevate the temperature of the mixture to between 160° C. and 350° C. and then discharging the mixture at such temperature into a zone of relatively low pressure with respect to the pressure in said tube, thereby effecting a separation of water vapor and maleic anhydride vapor from said mixture.

5. The method of decomposing maleic acid to maleic anhydride which comprises mixing the maleic acid with sufficient heat-stable, fluid flux, chemically inert to maleic acid and maleic anhydride, to provide a fluid mixture, heating the mixture rapidly to a temperature between 160° C. and 400° C. under pressure, then reducing the pressure on the mixture to effect separation of water vapor therefrom, further heating residual mixture distributed with respect to a heating medium, which is at a temperature between 160° C. and 400° C., in such a manner that all of the mixture being heated is within one-half centimeter of the heating medium to effect substantially complete removal of maleic acid from said mixture.

6. The method of decomposing maleic acid to maleic anhydride, which comprises mixing the maleic acid with sufficient heat-stable, fluid flux, chemically inert to maleic acid and maleic anhydride, to provide a fluid mixture, heating the mixture rapidly to a temperature between 160° C. and 400° C. under pressure, then reducing the pressure on the mixture to effect separation of water vapor therefrom, distributing the residual mixture as a film less than one-half centimeter thick upon a surface maintained at a temperature of between 160° C. and 400° C. to substantially completely remove residual maleic acid from said mixture.

7. The method of decomposing maleic acid to maleic anhydride, which comprises forming a mixture of the maleic acid with sufficient maleic anhydride to form a mixture fluid at 130° C., heating the mixture to 130° C. and passing the hot mixture through a heated zone at elevated pressure at an hourly space velocity of at least 60, supplying heat to the mixture while passing through said zone at such a rate as to elevate the temperature of the mixture to between 180° C. and 250° C., discharging the mixture into a zone of relatively low pressure with respect to the pressure of said first zone, thereby effecting a separation of water vapor and maleic anhydride vapor from said mixture, and continuing the heating of residual mixture by contact thereof as a film at relatively low pressure on a surface maintained between 180° and 250° C. thereby to effect a substantially complete removal of residual maleic acid from said mixture.

8. The method of decomposing maleic acid to maleic anhydride, which comprises forming a mixture of the maleic acid with sufficient heat-stable, fluid flux, chemically inert to maleic acid and maleic anhydride, to provide a mixture fluid at 130° C., heating the mixture to about 130° C. and passing the hot mixture through a heated zone at elevated pressure at an hourly space velocity of at least 60, supplying heat to the mixture while passing through said zone at such a rate as to elevate the temperature of the mixture to between 160° C. and 350° C. and then discharging the mixture at high velocity substantially circumferentially into a substantially cylindrical chamber, the wall surfaces of which are maintained at a temperature between 160° and 350° C. thereby causing the liquid to flow spirally down through said chamber as a violently agitated film less than one half centimeter thick, whereby residual maleic acid is substantially completely removed from the mixture.

9. The continuous method of decomposing maleic acid to maleic anhydride, which comprises forming a mixture of the maleic acid with sufficient molten maleic anhydride to form a mixture fluid at 130° C., heating the mixture to about 130° C. and passing the hot mixture through an externally heated tube at elevated pressure at an hourly space velocity of at least 60, supplying heat to the mixture while passing through said tube at such a rate as to elevate the temperature of the mixture to between 160° C. and 350° C. and then discharging the mixture at high velocity substantially circumferentially into a substantially cylindrical chamber the wall surfaces of which are maintained at a temperature between 160° and 350° C. thereby causing the liquid to flow spirally down through said chamber as a violently agitated film less than one-half centimeter thick, whereby residual maleic acid is substantially completely removed from the mixture, distilling off maleic anhydride from residual tar, condensing maleic anhydride thus distilled and returning it for admixture with additional quantities of maleic acid.

10. The continuous method of decomposing maleic acid to maleic anhydride, which comprises forming a mixture of solid maleic acid in finely divided form with sufficient molten maleic anhydride at a temperature below 100° C. to form a fluid mixture, passing the mixture through an externally heated tube to heat the mixture to about 130° C. and passing the hot mixture through an externally heated tube having a length to diameter ratio of at least 400:1, at an hourly space velocity of at least 360, supplying heat to the mixture while passing through said tube at such a rate as to elevate the temperature of the mixture to between 160° C. and 350° C. and then discharging the mixture at high velocity substantially circumferentially into a substantially cylindrical chamber the wall surfaces of which are maintained at a temperature between 160° and 350° C. thereby causing the liquid to flow spirally down through said chamber as a vigorously agitated film less than one-half centimeter thick, whereby residual maleic acid is substantially completely removed from the mixture, distilling off maleic anhydride from residual tar, condensing maleic anhydride thus distilled, and returning it for admixture with additional quantities of maleic acid.

11. The method of decomposing maleic acid to maleic anhydride, which comprises forming a mixture of the maleic acid with sufficient molten maleic anhydride at a temperature below 100° C. to form a fluid mixture, heating the mixture rapidly to a temperature between 160° C. and 400° C. under pressure and introducing it into a body of hot maleic anhydride vapor maintained at a substantially lower pressure whereby a part of the water vapor is separated from the mixture by flash vaporization and the remainder is evaporated by contact with said maleic anhydride vapor.

12. The method of decomposing maleic acid to maleic anhydride, which comprises mixing the maleic acid with sufficient heat-stable, fluid flux, chemically inert to maleic acid and maleic anhydride, to provide a fluid mixture, heating the mixture rapidly to a temperature between 160° C. and 400° C. under pressure and then reducing the pressure on the mixture to not more than about one-third atmosphere to effect separation of water vapor therefrom.

13. The method of decomposing maleic acid, to maleic anhydride, which comprises mixing the maleic acid with sufficient molten maleic anhydride to form a fluid mixture, heating the mixture rapidly to a temperature between 160° C. and 400° C. under pressure and then reducing the pressure on the mixture to not more than about one-third atmosphere to effect separation of water vapor therefrom.

14. The method of decomposing maleic acid to maleic anhydride, which comprises forming a mixture of the maleic acid with sufficient heat-stable, fluid flux, chemically inert to maleic acid and maleic anhydride, to provide a mixture fluid at 130° C., heating the mixture to 130° C. and passing the hot mixture through a heated zone under pressure at an hourly space velocity of at least 60, supplying heat to the mixture while passing through said zone at such a rate as to elevate the temperature of the mixture to between 160° C. and 400° C. and then discharging the mixture into a zone maintained at a pressure not greater than about one-third atmosphere so as to effect separation of water vapor from said mixture.

15. The method of decomposing maleic acid to maleic anhydride, which comprises forming a mixture of the maleic acid with sufficient molten maleic anhydride to form a mixture fluid at 130° C., heating the mixture to 130° C. and passing the hot mixture through a heated zone under pressure at an hourly space velocity of at least 60, supplying heat to the mixture while passing through said zone at such a rate as to elevate the temperature of the mixture to between 160° C. and 400° C. and then discharging the mixture into a zone maintained at a pressure not greater than about one-third atmosphere so as to effect separation of water vapor from said mixture.

GEORGE B. CAMPBELL.
FRANK PORTER.